US010521806B2

(12) United States Patent
Cantrell et al.

(10) Patent No.: US 10,521,806 B2
(45) Date of Patent: Dec. 31, 2019

(54) BLOCKCHAIN-BASED SYSTEM AND METHOD FOR SUPPLY CHAIN CONTROL

(71) Applicant: Walmart Apollo, LLC, Bentonville, AR (US)

(72) Inventors: Robert Cantrell, Herndon, VA (US); Daniel W. Young, Rogers, AR (US); Brian McHale, Oldham (GB); John J. O'Brien, Farmington, AR (US); Todd Mattingly, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/284,485

(22) Filed: Feb. 25, 2019

(65) Prior Publication Data

US 2019/0266613 A1 Aug. 29, 2019

Related U.S. Application Data

(60) Provisional application No. 62/636,781, filed on Feb. 28, 2018.

(51) Int. Cl.
*G06K 19/07* (2006.01)
*G06Q 30/00* (2012.01)

(52) U.S. Cl.
CPC ..... *G06Q 30/0185* (2013.01); *G06K 19/0717* (2013.01); *G06K 19/0723* (2013.01)

(58) Field of Classification Search
None
See application file for complete search history.

(56) References Cited

U.S. PATENT DOCUMENTS

| 10,282,967 B2* | 5/2019 | Law | G06Q 10/087 |
| 2010/0141394 A1* | 6/2010 | Sugiyama | G06K 7/0008 |
| | | | 340/10.4 |

(Continued)

FOREIGN PATENT DOCUMENTS

WO   2018013047 A1   1/2018

OTHER PUBLICATIONS

Deloitte, "Continuous interconnected supply chain Using Blockchain and Internet-of-Things in supply chain traceability," 2017.

(Continued)

*Primary Examiner* — Christle I Marshall
(74) *Attorney, Agent, or Firm* — Venable LLP; Jeffri A. Kaminski, Esq.

(57) ABSTRACT

A blockchain-based method includes: receiving, by a smart label via accessing a block of a blockchain stored on a computer system, a cold chain requirement for a product, wherein the smart label is affixed to a package containing the product, the cold chain requirement for the product is specified and stored by a manufacturer of the product in the block of the blockchain; storing, by the smart label, the cold chain requirement in a memory of the smart label; receiving, by the smart label, from a temperature sensor a temperature of the product, wherein the temperature sensor is affixed to the package containing the product; comparing, by the smart label, the temperature of the product with a temperature range of the product specified in the cold chain requirement; and adding, by the smart label, the temperature of the product and a time at which the temperature of the product is received by the smart label, to the blockchain, if the temperature of the product is outside of the temperature range specified in the cold chain requirement.

20 Claims, 5 Drawing Sheets

(56) References Cited

U.S. PATENT DOCUMENTS

| | | | |
|---|---|---|---|
| 2015/0039529 A1* | 2/2015 | Barakat | G06Q 10/0832 |
| | | | 705/332 |
| 2015/0317896 A1* | 11/2015 | Planton | G06K 19/0717 |
| | | | 340/584 |
| 2017/0053290 A1* | 2/2017 | Atkinson | G06Q 10/0832 |
| 2017/0132393 A1 | 5/2017 | Natarajan et al. | |
| 2017/0147975 A1 | 5/2017 | Natarajan et al. | |
| 2017/0229000 A1* | 8/2017 | Law | G06Q 10/087 |
| 2017/0270472 A1 | 9/2017 | High et al. | |
| 2017/0300928 A1 | 10/2017 | Radocchia et al. | |
| 2017/0322090 A1* | 11/2017 | Jones | G01K 1/022 |
| 2018/0003572 A1* | 1/2018 | Garsd | G01K 13/00 |
| 2018/0052462 A1 | 2/2018 | Arena | |
| 2018/0181909 A1* | 6/2018 | Wilkinson | G06K 9/00335 |
| 2019/0026689 A1* | 1/2019 | Minard | G06Q 10/083 |
| 2019/0205830 A1* | 7/2019 | O'Brien | G06Q 10/0835 |

OTHER PUBLICATIONS

Trakopolis, "Supply Chain + Blockchain," 2018.
Microsoft, "How blockchain will transform the modern supply chain," 2018.
Accenture Life Sciences, "In Blockchain we Trust: Transforming the Life Sciences Supply Chain," 2018.
IBM Blockchain and Sap IoT Solution for the Pharmaceutical Cold Chain, https://www.youtube.com/watch?v=-3FuWl9hTgc, Jun. 20, 2017.
International Search Report and Written Opinion dated May 6, 2019, issued in corresponding PCT Application No. PCT/US2019/019437.

\* cited by examiner

BLOCKCHAIN-BASED SYSTEM AND METHOD FOR SUPPLY CHAIN CONTROL

CROSS-REFERENCE TO RELATED APPLICATION

This application claims the benefit of U.S. Provisional Patent Application No. 62/636,781, filed Feb. 28, 2018, which is incorporated herein by reference in its entirety.

BACKGROUND

1. Technical Field

The present disclosure relates to a supply chain management system, and more specifically to a blockchain-based system and method for supply chain and cold chain control.

2. Introduction

Blockchain is a shared and distributed ledger that may facilitate the process of recording transactions and tracking assets in a peer-to-peer network. An asset may be tangible (e.g., a house, a car, and so on). An asset may also be intangible like intellectual property (IP), such as patents, copyrights, or branding. A blockchain-based supply chain system may facilitate accurately and efficiently transferring products and reduce disputes among different parties.

SUMMARY

A method for performing concepts disclosed herein can include: receiving, by a smart label via accessing a block of a blockchain stored on a computer system, a cold chain requirement for a product, wherein the smart label is affixed to a package containing the product, the cold chain requirement for the product is specified and stored by a manufacturer of the product in the block of the blockchain; storing, by the smart label, the cold chain requirement in a memory of the smart label; receiving, by the smart label, from a temperature sensor a temperature of the product, wherein the temperature sensor is affixed to the package containing the product; comparing, by the smart label, the temperature of the product with a temperature range of the product specified in the cold chain requirement; and adding, by the smart label, the temperature of the product and a time at which the temperature of the product is received by the smart label, to the blockchain, if the temperature of the product is outside of the temperature range specified in the cold chain requirement.

A system configured as disclosed herein can include: a computer system configured to store a blockchain of a product; a smart label configured to: receive, via accessing a block of the blockchain by communicating with the computer system, a cold chain requirement for the product, wherein the smart label is affixed to a package containing the product, the cold chain requirement for the product is specified and stored by a manufacturer of the product in the block of the blockchain; store the cold chain requirement in a memory of the smart label; receive from a temperature sensor a temperature of the product, wherein the temperature sensor is affixed to the package containing the product; compare the temperature of the product with a temperature range of the product specified in the cold chain requirement; and add the temperature of the product and a time at which the temperature of the product is received by the smart label, to the blockchain, if the temperature of the product is outside of the temperature range specified in the cold chain requirement; and the temperature sensor configured to: detect the temperature of the product; and transmit the temperature of the product to the smart label.

A non-transitory computer-readable storage medium configured as disclosed herein can have instructions stored which, when executed by a computing device, cause the computing device to perform operations which include: receiving, by a smart label via accessing a block of a blockchain stored on a computer system, a cold chain requirement for a product, wherein the smart label is affixed to a package containing the product, the cold chain requirement for the product is specified and stored by a manufacturer of the product in the block of the blockchain; storing, by the smart label, the cold chain requirement in a memory of the smart label; receiving, by the smart label, from a temperature sensor a temperature of the product, wherein the temperature sensor is affixed to the package containing the product; comparing, by the smart label, the temperature of the product with a temperature range of the product specified in the cold chain requirement; and adding, by the smart label, the temperature of the product and a time at which the temperature of the product is received by the smart label, to the blockchain, if the temperature of the product is outside of the temperature range specified in the cold chain requirement.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
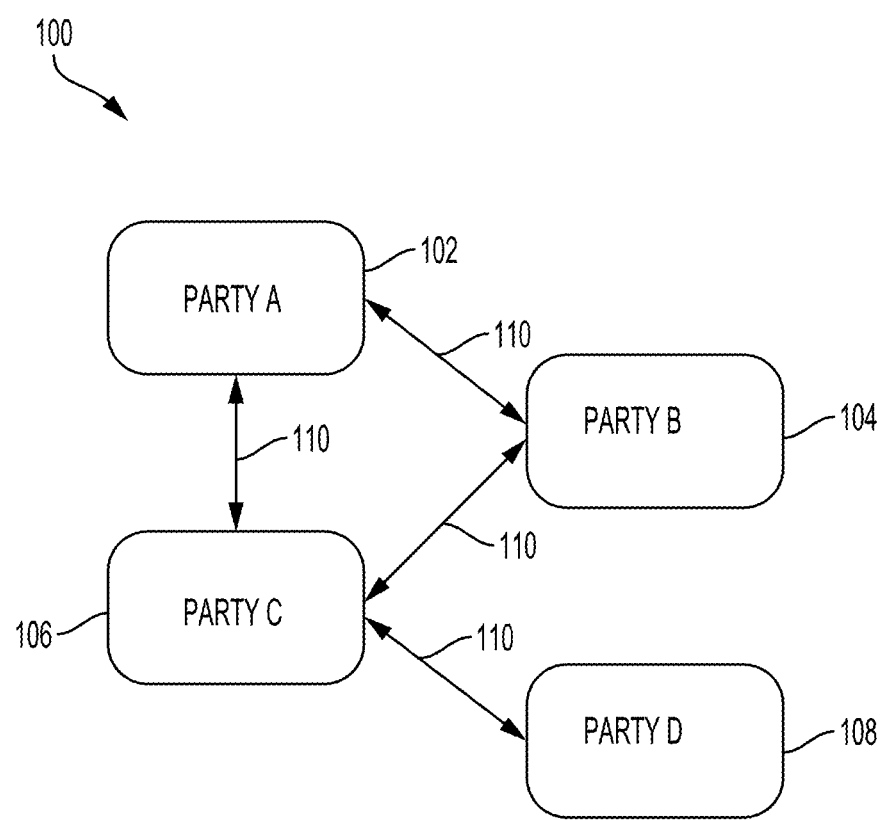
FIG. 1 illustrates an exemplary peer-to-peer network between a plurality of parties for tracking a product.

Systems, methods, and computer-readable storage media configured according to this disclosure are capable of tracking a product, for example, in a supply chain. By using blockchain to track a product, access to information that is authentic and whose "chain of title" is irrefutable, can be decentralized. The underlying ledger (blockchain) is tamper-evident. No parties can tamper with a transaction after it's been recorded to the ledger. If a transaction is changed, a new transaction must be used to reverse the change, and both transactions are then visible. A single and shared ledger can provide one place to go to determine the ownership and status of the product without disputes.

A blockchain transaction happens as products change hands from one party to another party in the supply chain. A hash of the blockchain transaction may be generated using a key embedded in a secure element of a shipping box containing the product, such as a radio frequency identifier (RFID) or a smart seal or smart packing strip. The shipping box may stay sealed until it reaches a destination where the shipping box is opened. Once the shipping box is opened, other coding on the products inside the shipping box can be implemented to generate hashes of transactions, such as RFID on the product, or barcode on the product, for the product seamlessly transferring into existing inventory control systems. The above hashes may be stored in blocks of the blockchain.

In some embodiments, the disclosed system and method may be applied to track the physical status of a product, such as temperature, vibration, shock, etc. In such cases, the shipping box may be provided a temperature monitoring device (e.g., a temperature sensor or thermometer). The temperature monitoring device may include a memory storing temperature requirements of products in the box. As long as the temperatures are in compliance with the requirements, no action may be taken. Once a temperature threshold is crossed, the disclosed system or the temperature monitoring device may begin logging the over- or under-temperature and the corresponding time. The logged temperature and corresponding time may be hashed into to the blockchain record. The logged temperature and time data may be recorded in an unencrypted "side-chain," linked to the blockchain record, but available for inspection without use of a private key. This can allow for identifying trends in the data and comparing carriers or couriers, etc. The disclosed system may also compare "ideal" or "intended" temperatures with the actually measured temperatures.

In some embodiments, a smart label may be used to record data of time and temperature of a product and package containing the product while the product is in route. The smart label may refer to a flatly configured transponder under a conventional print-coded label, which may include chip, antenna and bonding wires as an inlay. This data may be added to the blockchain ledger periodically. The disclosed system with smart labels may also be able to track products for recall and to identify products which have been exposed to temperatures outside of their requirements.

In some embodiments, the smart label may communicate with a point of sale (POS) and self-checkout system (SCO) devices to indicate that the product is temperature compliant at the sale point. A smart cooling device, such as a refrigerator or freezer, may communicate with the smart labels and read and inform the status of the product. The smart cooling device may also be able to determine expiry of the products contained within by checking information of the products stored therein and transmitted thereto from the smart label.

In some embodiments, smart labels may be affixed to the packaging box of products at the manufacturer. These smart labels may track the time and temperature exposure of the packaging box until it is unpacked. Once unpacked, the smart label on the packaging box can communicate with the individual product label affixed to the product (e.g., a smart label affixed to the product), and download the time and temperature data from the smart label on the packing box to these product labels. That is, the data stored in the smart label on the packaging box may be transferred to the smart label affixed to the individual product. This may be facilitated using an RF shielding layer inside the packaging box and a local reader and writer at the unpacking station. The product labels may also have a capability of WIFI communications so that the products can be localized within the store using WIFI.

In some embodiments, if a peer-to-peer network is permissioned, it can enable the creation of a parties-only network with proof that parties are who they say they are. This may protect the system against tampering, fraud, and cybercrime.

In some embodiments, through the use of IDs and permissions, parties can specify which transaction details they want other parties to view. Permissions can be expanded for special parties. For example, to verify a product, a customer may be authorized to aaccess all the transaction documents of all the parties.

In some embodiments, permissions and cryptography may be used to prevent unauthorized access to the peer-to-peer network and ensure that parties are who they claim to be. Privacy can be maintained through cryptographic techniques and data partitioning techniques to give parties selective visibility into the ledger; both the transaction documents and the identity of parties who own the transaction documents can be masked. After conditions are agreed to, parties cannot tamper with a record of the transactions.

In some configurations, communications between the devices can take the form of a blockchain, where each request and response made by devices can be added to the blockchain ledger. As any device takes an action (sending a request, sending a response to a request), that information is added to the blockchain. More specifically, the request, response, or other action is hashed into the previous blockchain. This new, updated blockchain is then distributed to the other devices within the group.

Various specific embodiments of the disclosure are described in detail below. While specific implementations are described, it should be understood that this is done for illustration purposes only. Other components and configurations may be used without parting from the spirit and scope of the disclosure, and can be implemented in combinations of the variations provided. These variations shall be described herein as the various embodiments are set forth. The disclosure now turns to FIG. 1.

FIG. 1 illustrates an exemplary peer-to-peer network 100 between a pluralities of parties 102, 104, 106, 108 who may involve transactions of a product. A peer-to-peer network such as that illustrated is a network where each node can relay data from and to other nodes within the network. While peer-to-peer networks can be constructed to operate in wired conditions, they are more prevalent in wireless configurations, where messages can be broadcast to other nearby nodes (i.e., not sent to a specific node, but rather all nodes within a given distance of the broadcasting node). When a receiving node is located outside the broadcast range of a transmitting node, intermediate nodes may be required to route the transmission to the receiving node. For example, as illustrated, node A (party A) 102 can communicate 110 with nodes B (party B) 104 and C (party C) 106, and nodes B 104 and C 106 can communicate 110 with each other. However, nodes A 102 and B 104 cannot communicate with node D (party D) 108. Because node D 108 can only communicate with node C 106, any communications 110 between node A 102 and node D 108, or between node B 104 and node D 108, must route through node C 106.

When transferring a product, for example, from a manufacturer to a retailer or customer, the various parties may communicate with one another via a peer-to-peer network 100. That is, the various parties may use devices at each node to transmit, receive, and relay messages between themselves as necessary. The devices used by the various parties may include, but not limited to, mobile phones, computing tablets, desktop computers, servers, laptop computers, smart phones, mainframes, and so forth.

Figure 2:
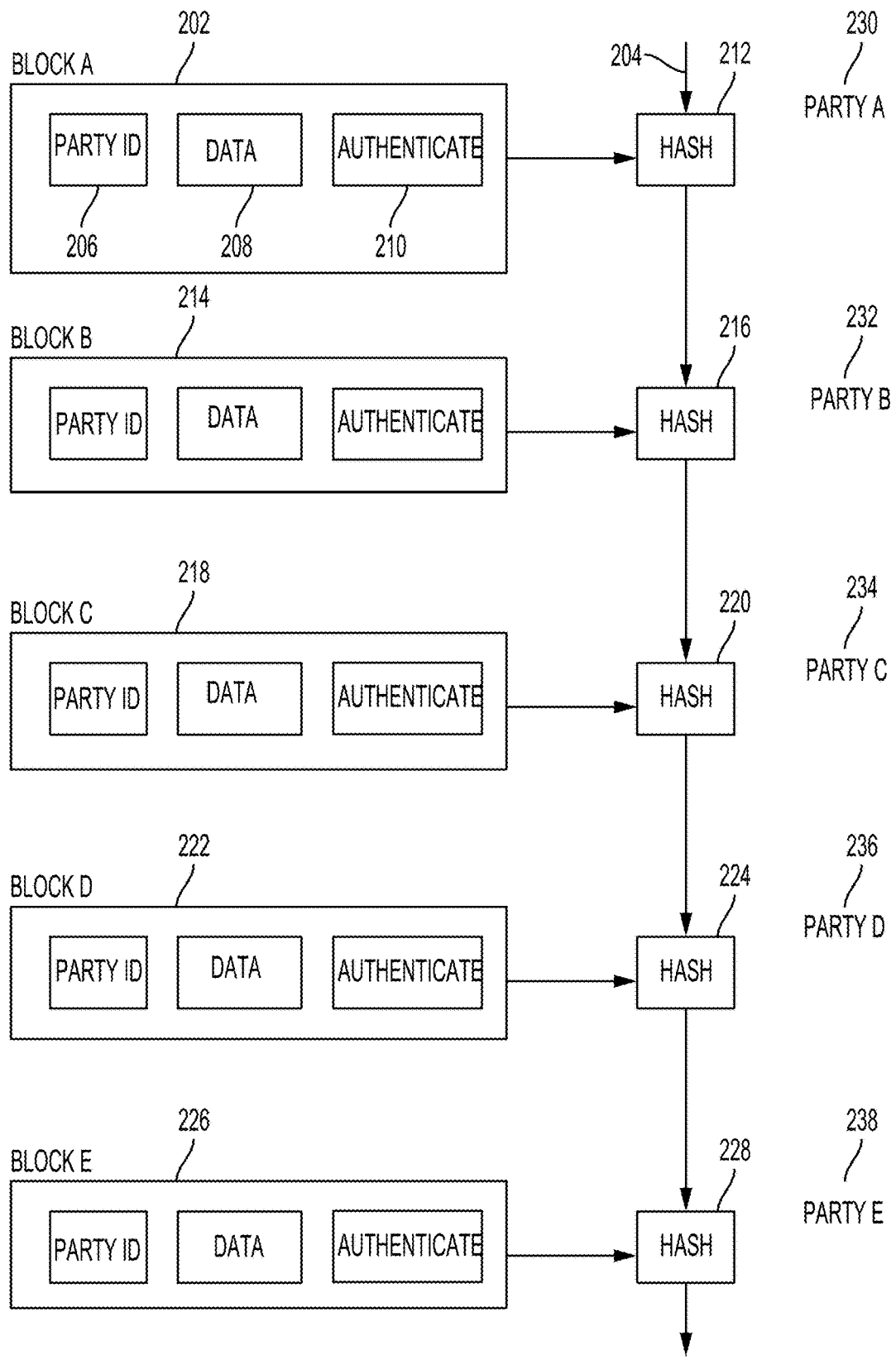
FIG. 2 illustrates an exemplary Blockchain-based interactions between the plurality of parties.

FIG. 2 illustrates an exemplary blockchain based on interactions between a plurality of parties for transferring a product using the network 100 of FIG. 1. A blockchain is a distributed digital ledger which is communicated electronically between the parties. Each transaction recorded within the digital ledger is a block which can be hashed or otherwise encrypted. As new transactions are added to the digital ledger, each transaction's veracity can be tested against the previous ledger stored by the devices, and can, in some configurations, require confirmation from a defined percentage (usually 50%) of the devices to be added to the blockchain.

In the case of transferring a product, the blockchain can take the form illustrated in FIG. 2. In this example, there is a blockchain 204 which is distributed among multiple parties. One of the devices, an initiating device (party A 230, a manufacturer of the product), determines to transfer the product to a wholesale dealer (party C 234) via a courier (party B 232), and may store transaction data and product data (e.g., product specification, warranty information, handling requirement, etc.) in a block of the blockchain 204. In this example, a block (Block A 202) is generated to store the data of party A 230. The block 202 added to the blockchain 204 may contain an ID 206 of party A 230, or an address or identification of a device that may be used by the party A 230, and the data 208. The data 208 may include logged temperatures of a packaging box containing the product when the packaging box is transferred to a courier, times and dates at which the logged temperatures are logged, expiration date of the product, etc. In addition, the block 202 can contain an authentication 210 portion. The authentication 210 portion may set restrictions of different levels on the data 208 and the party ID 206. For example, the data 208 and the party ID may be set not to be visible or accessible to other parties other than party A. The authentication 210 may authorize other parties to view partial portion or details of the data 208 and the party ID, for example, the title of a document. In addition, the authentication 210 may authorize a full access to the data 208 to a special party, for verifying the product. The data 208 may be encrypted.

The data 208 may also be part of a smart contract, which is an agreement or set of rules that govern how the product is transferred among parties. The smart contract is stored on the blockchain and is executed automatically as part of a transaction.

As the device generates the block 202, the block 202 is hashed 212 into the previous blockchain 204, resulting in an updated blockchain which is distributed among the parties in the group.

The other parties receive the updated blockchain containing the block 202. Party B 232 as a courier may transport the product from party A to Party C. In this case, party B 232 generate a block 214 to store their data related to transportation in the blockchain 204. Similar to block 202, block 214 may store the related transaction data of party B 232, an ID of party B 232, or an address or identification of a device that may be used by the party B 232, and an authentication portion. In addition, party B 232 may monitor the product by, for example, communicating via a smart device of the party B 232 (e.g., a mobile phone carried by a driver) with the smart label affixed to the packaging box, while in route according to the supply chain or cold chain requirements of the product, and accordingly log those monitored data into either the block 214 or a side-chain of the blockchain 204.

As the device generates the block 214, the block 214 is hashed 216 into the previous blockchain 204, resulting in an updated blockchain which is distributed among the parties in the group Party C 234 as a wholesale dealer may generate block 218 accordingly when receiving the product from party B 232. The block 218 may be hashed into the blockchain 204, resulting in an updated blockchain which is then distributed among the parties in the group.

In some cases, the wholesale dealer party C 234 may transfer the product to a local seller party E via another courier party D. Accordingly, similar to parties A and B, parties D and E generate corresponding blocks that are hashed into the blockchain 204, resulting in an updated blockchain which is then distributed among the parties in the group.

Figure 3:
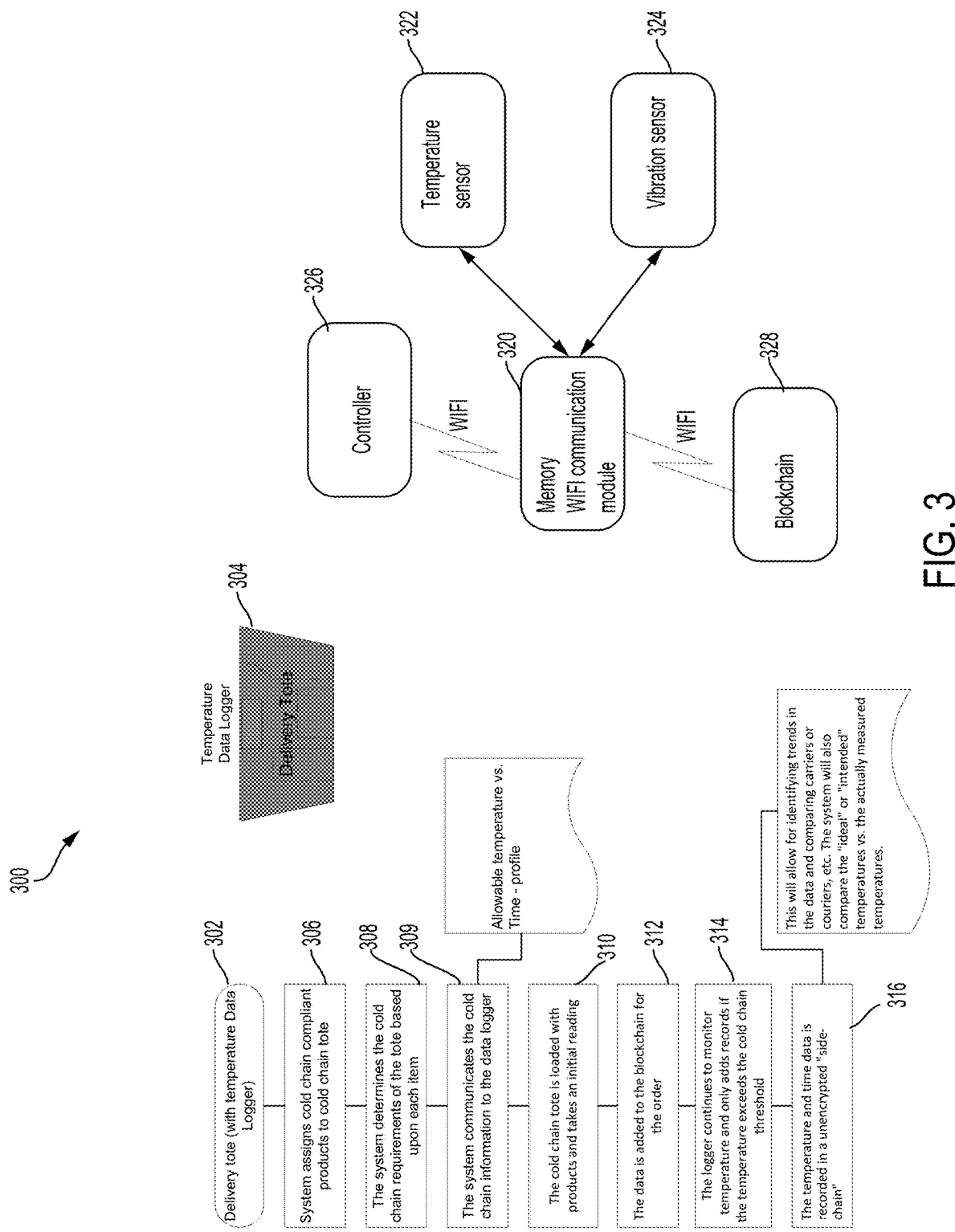
FIG. 3 illustrates a block diagram of a blockchain-based process for tracking products.

FIG. 3 illustrates a block diagram of a blockchain-based process for transferring a product. In this example, a blockchain platform may be used to store and secure the transactions from each participating parties. One or more products may be transferred from a first party to a second party (for example from a manufacturer to a retailer) via a courier. The one or more products may be packed into a delivery tote of the courier.

At block 302, a delivery tote is provided. As defined here, the delivery tote can be any form of container including, but not limited to, a box, a refrigerator, a bag, etc. An example delivery tote 304 may have a temperature data logger, also referred to as a temperature monitoring device, (e.g., a RFID tag) that is capable of communicating with other devices for sending and receiving data, for example, via a WIFI network. The tote may also have other data loggers in accordance with the supply chain requirement of the products. The supply chain requirement of the product may be specified by the manufacturer of the product. For example, in addition to temperature requirements of the product, the supply chain requirements may also specify humidity requirements of the product and vibration requirements of the product. Accordingly, the tote may also be equipped with a humidity monitoring device including a humidity data logger and a humidity sensor, a vibration monitoring device including a vibration data logger and a vibration or shock sensor, etc.

In this example, the products are cold products. However, the disclosed systems and methods can be applicable to any product. In block 306, cold chain compliant products may be assigned to the delivery tote. Those products each may have different temperature requirements.

In block 308, the system may determine the cold chain requirements of the tote based upon each product assigned to the tote. For example, the cold chain requirements of the tote may be determined by reading one or more smart labels affixed to the tote, from blocks of the block chain storing the cold chain requirements of the products to be stored inside the tote. The cold chain requirements of the products may be specified by manufacturers of corresponding products and stored in the blocks of the blockchain.

As described above, the cold chain requirements of the tote may be communicated from the blockchain to and stored in a memory of a smart label affixed to the tote, for example, a smart label comprising the temperature data logger of the tote (block 309). The cold chain requirements of the products or the tote may include allowable temperature versus time profiles for each product.

The tote can then be loaded with the assigned products, and the temperature data logger may take an initial reading of the temperature of the tote (block 310). The temperature of the tote may be a temperature inside the tote, a temperature outside of the tote, or a combination of both temperatures.

In block 312, the data (e.g., the initial readings of the temperature of the tote and the time at which the initial readings are taken) may be stored in the memory of the data logger and also added to the blockchain by transmitting the data via networks (e.g., WIFI). The data may also include information of the products loaded into the tote, for example, names of the product, quantity of the products, etc. The data may be encrypted. Various access levels of the data may be set. For example, the data may be completely accessible to the manufacturer, but may be partially accessible to a customer.

In block 314, the temperature data logger may continue to monitor temperatures of the tote while the tote is in route. The temperature data logger may add blockchain records of temperature and the time at which the temperature is taken, if the detected temperature exceeds the cold chain threshold, for example, outside of a temperature range specified in the cold chain requirements.

In some embodiments, the temperatures received by the data logger and the times at which the temperatures are received by the data logger, may be recorded in the blockchain as unencrypted side chains (block 316). This may allow for identifying temperature change trends in the data and comparing carriers or couriers, etc. For example, different couriers may result in different temperature change profiles, which can be used to evaluate both the products and the performance of the couriers. The disclosed system may also compare the "ideal" or "intended" temperatures with the actually measured temperatures. The ideal temperature may be specified in the cold chain requirements.

In some embodiments, the recorded data in the blockchain may be encrypted so the party (e.g., a manufacturer) loading the recorded data into the blockchain has a private key. The party may provide its private key so that a dealer or buyer can have a full access to the recorded data and is able to decrypt all the recorded data to do comparison and analysis.

FIG. 3 also illustrates an example smart label 320 (e.g., RFID) that may monitor temperatures of the products, vibrations or shaking of the products, and other factors based on the supply chain requirements received from blocks of a blockchain. The supply chain requirements may be stored in the blocks of the blockchain by manufactures of the products. The smart label 320 may include a memory and a WIFI communication module. The smart label 320 can communicate via a wired or wireless (e.g., Bluetooth, near infrared) connection with a temperature sensor 322 and a vibration sensor 324 to receive sensory signals from them. The smart label 320 may be configured to be capable of processing these sensory signals and store them in the memory. The smart label 320 can communicate via WIFI with a controller 326 (e.g., a retailer's server), for example, to receive delivery information and other instructions. In addition, the smart label 320 may communicate via WIFI with a blockchain 328, for example, to receive the supply chain requirements for the products and send the processed sensory data to the blockchain.

Also the smart label 320 may be configured to activate and deactivate some sensors based on the supply chain requirements for each product in the tote. For example, if all products in the tote are temperature-controlled, then no vibration sensors are required, so the vibration sensors can be deactivated. The smart label 320 may be activated when products are loaded into the associated tote. The disclosed system may send an activation signal to activate the smart label 320 when the products are loaded into the associated tote. The activation signal may include instruction to obtain the logic for the mission from a blockchain location. The logic may be loaded into and run by the smart label 320. The logic may define the sensors to be activated, the parameters to be monitored, threshold levels or ranges for parameters, etc. The logic may also provide the smart label a ledger location to use in storing information associated with the present mission.

Figure 4:
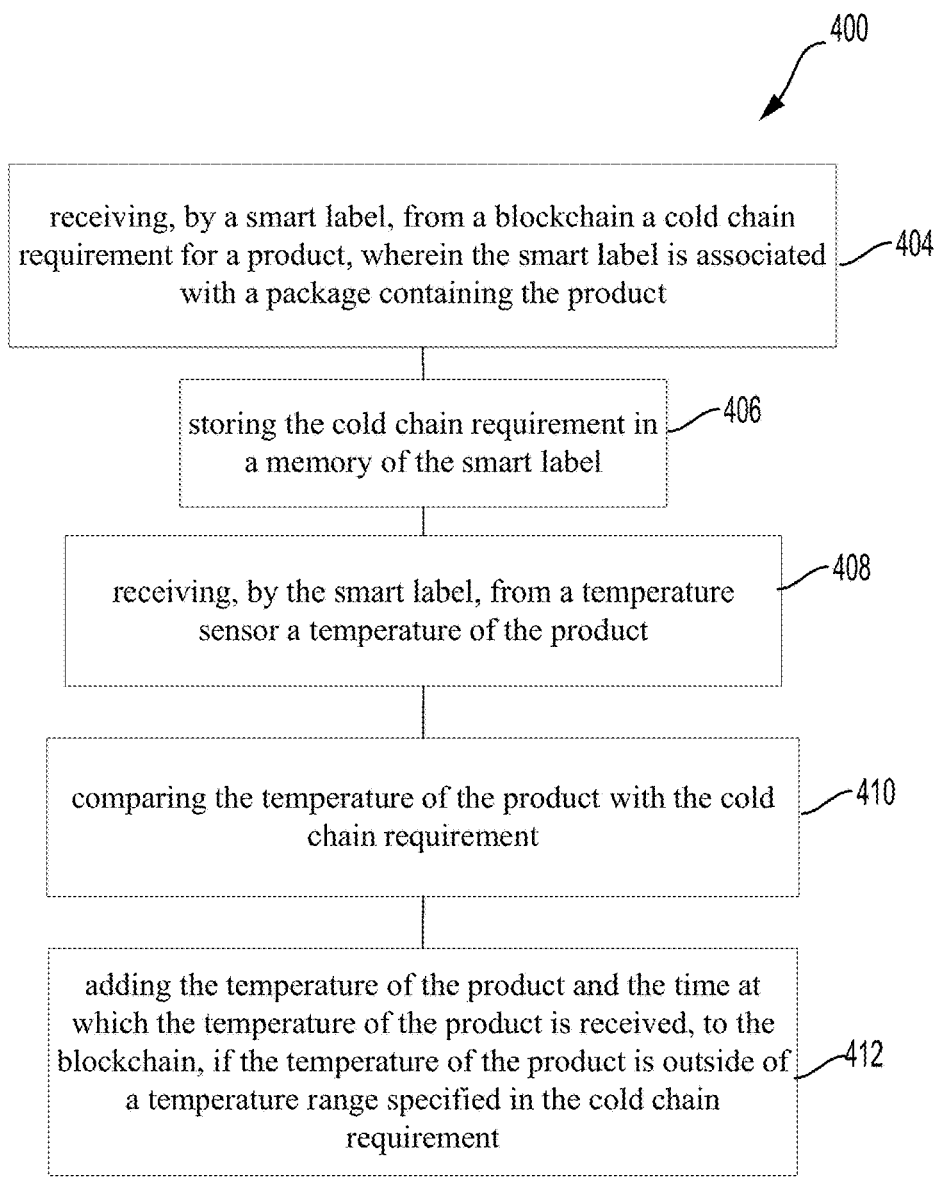
FIG. 4 illustrates an exemplary method of tracking a product based on blockchain.

FIG. 4 illustrates an exemplary method 400. The method 400 may be implemented in the above disclosed systems, and may include the following steps.

At step 404, requirements (for example, a cold chain requirement) for a product may be received, for example, by a smart label from a blockchain. The smart label may be a RFID or other form of labels, and may be affixed to a package containing the product. The requirements may be generated and stored in a block of the blockchain by a manufacturer of the product.

At step 406, the cold chain requirement may be stored in a memory of the smart label. The smart label may communicate via a network (e.g., a WIFI) to retrieve the cold chain requirement from the block and store it in its memory.

At step 408, the smart label may receive from a temperature sensor a temperature of the product. The smart label may constantly monitor the temperature of the product or package. The temperature may be a temperature inside, outside, or a combination thereof, of the package. One or more temperature sensors may be located inside and/or outside of the package, and may be configured to be capable of transmitting temperature signals to the smart label.

At step 410, the temperature of the product is compared with the cold chain requirement. When the actual temperature of the product is received by the smart label, the actual temperature is compared with a temperature or a temperature range specified for the product in the cold chain requirement saved in the memory of the smart label.

At step 412, the temperature of the product and the time at which the temperature of the product is received, may be added to the blockchain, if the temperature of the product is outside of a temperature range specified in the cold chain requirement. The smart label constantly receives the actual temperatures of the product from the one or more sensors, and compares the actual temperatures to the cold chain requirements. When the actual temperatures are over or under a temperature threshold specified in the cold chain requirement, the actual temperatures and their corresponding recorded times can be added to the blockchain.

In some embodiments, the cold chain requirement may comprise an allowable temperature versus time profile for the product. The temperature of the product and the time at which the temperature of the product is received, is recorded in an unencrypted side-chain of the blockchain.

In some embodiments, the method 400 may further comprise identifying a temperature change trend based on the side-chains of the blockchain.

In some embodiments, the method 400 may further comprise storing the temperature of the product and the time at which the temperature of the product is received, in the memory of the smart label; and transferring the temperature of the product and the time at which the temperature of the product is received, from the memory of the smart label (this smart label being affixed to the package containing the product) to a memory of a smart label of the product.

As described above, other sensors may be activated or deactivated based on the requirements for that product. The steps for cold chain here are equally applicable to other sensors, such as receiving a reading from the sensor, and comparing the reading with specified sensor reading threshold or range in the supply chain, etc.

Figure 5:
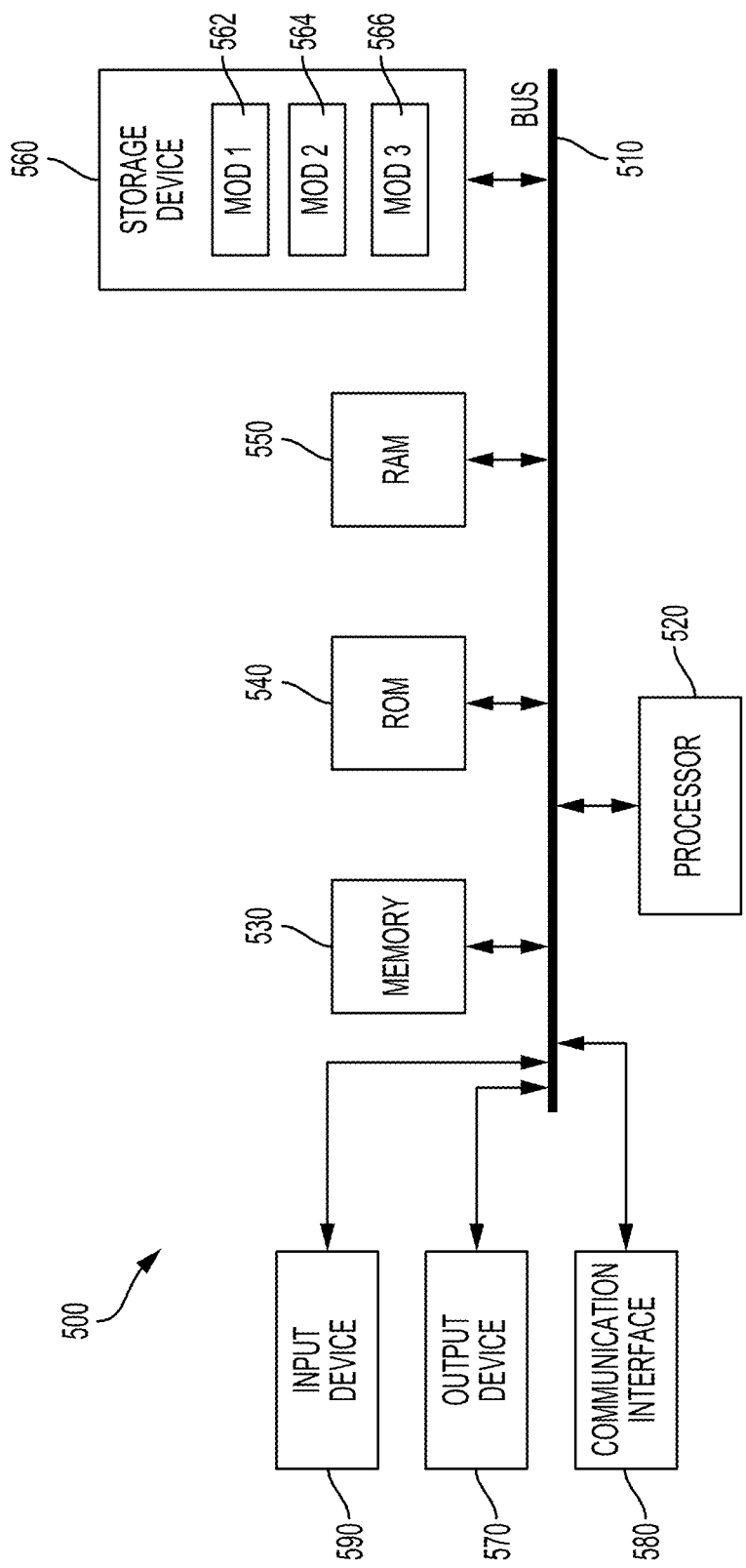
FIG. 5 illustrates an exemplary computer system.

With reference to FIG. 5, an exemplary system 500 can include a processing unit (CPU or processor) 520 and a system bus 510 that couples various system components including the system memory 530 such as read only memory (ROM) 540 and random access memory (RAM) 550 to the processor 520. The system 500 can include a cache of high speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:
1. A blockchain-based method comprising:
   receiving, by a smart label via accessing a block of a blockchain stored on a computer system, a cold chain requirement for a product, wherein the smart label is associated with a package containing the product, the cold chain requirement for the product is stored in the block of the blockchain;
   storing, by the smart label, the cold chain requirement in a memory of the smart label;
   receiving, by the smart label, from a temperature sensor a temperature of the product, wherein the temperature sensor is affixed to the package containing the product;
   comparing, by the smart label, the temperature of the product with a temperature range of the product specified in the cold chain requirement; and
   adding, by the smart label, the temperature of the product and a time at which the temperature of the product is received by the smart label, to the blockchain, if the temperature of the product is outside of the temperature range specified in the cold chain requirement.

2. The method of claim 1, wherein the smart label is a radio frequency identifier (RFID).

3. The method of claim 1, wherein the cold chain requirement comprises an allowable temperature versus time profile for the product.

4. The method of claim 1, wherein the smart label is affixed to outside of the package, and the temperature sensor is located inside the package.

5. The method of claim 1, wherein the temperature and the time at which the temperature of the product is received by the smart label, is added in an unencrypted side-chain of the blockchain.

6. The method of claim 5, the method further comprising identifying a temperature change trend of the product based on the side-chain of the blockchain.

7. The method of claim 1, further comprising:
  storing the temperature of the product and the time at which the temperature of the product is received by the smart label, in the memory of the smart label; and
  transferring the temperature of the product and the time at which the temperature of the product is received by the smart label, from the memory of the smart label to a memory of a smart label of the product.

8. A blockchain-based system, comprising:
  a computer system configured to store a blockchain of a product;
  a smart label configured to:
    receive, via accessing a block of the blockchain by communicating with the computer system, a cold chain requirement for the product, wherein the smart label is associated with a package containing the product, the cold chain requirement for the product is specified and stored by a manufacturer of the product in the block of the blockchain;
    store the cold chain requirement in a memory of the smart label;
    receive from a temperature sensor a temperature of the product, wherein the temperature sensor is affixed to the package containing the product;
    compare the temperature of the product with a temperature range of the product specified in the cold chain requirement; and
    add the temperature of the product and a time at which the temperature of the product is received by the smart label, to the blockchain, if the temperature of the product is outside of the temperature range specified in the cold chain requirement; and
  the temperature sensor configured to:
    detect the temperature of the product; and
    transmit the temperature of the product to the smart label.

9. The system of claim 8, wherein the smart label is a radio frequency identifier (RFID).

10. The system of claim 8, wherein the cold chain requirement comprises an allowable temperature versus time profile for the product.

11. The system of claim 8, wherein the smart label is affixed to outside of the package, and the temperature sensor is located inside the package.

12. The system of claim 8, wherein the temperature and the time at which the temperature of the product is received, is recorded in an unencrypted side-chain the blockchain.

13. The system of claim 12, wherein the computer system is further configured to identify a temperature change trend based on the side-chain of the blockchain.

14. The system of claim 8, wherein the smart label is further configured:
  store the temperature of the product and the time at which the temperature of the product is received by the smart label, in the memory of the smart label; and
  transfer the temperature of the product and the time at which the temperature of the product is received by the smart label, from the memory of the smart label to a memory of a smart label of the product.

15. A non-transitory computer-readable storage medium having instructions stored which, when executed by a computing device, cause the computing device to perform operations comprising:
  receiving, by a smart label via accessing a block of a blockchain stored on a computer system, a cold chain requirement for a product, wherein the smart label is affixed to a package containing the product, the cold chain requirement for the product is specified and stored by a manufacturer of the product in the block of the blockchain;
  storing, by the smart label, the cold chain requirement in a memory of the smart label;
  receiving, by the smart label, from a temperature sensor a temperature of the product, wherein the temperature sensor is affixed to the package containing the product;
  comparing, by the smart label, the temperature of the product with a temperature range of the product specified in the cold chain requirement; and
  adding, by the smart label, the temperature of the product and a time at which the temperature of the product is received by the smart label, to the blockchain, if the temperature of the product is outside of the temperature range specified in the cold chain requirement.

16. The computer-readable storage medium of claim 15, wherein the smart label is a radio frequency identifier (RFID).

17. The computer-readable storage medium of claim 15, wherein the cold chain requirement comprises an allowable temperature versus time profile for the product.

18. The computer-readable storage medium of claim 15, wherein the smart label is affixed to outside of the package, and the temperature sensor is located inside the package.

19. The computer-readable storage medium of claim 15, wherein the temperature and the time at which the temperature of the product is received by the smart label, is recorded in an unencrypted side-chain the blockchain.

20. The computer-readable storage medium of claim 19, wherein the instructions stored which, when executed by the processor, cause the processor to further perform operations:
  identifying a temperature change trend based on the side-chain of the blockchain.

* * * * *